(12) United States Patent
Chin et al.

(10) Patent No.: US 7,084,197 B2
(45) Date of Patent: Aug. 1, 2006

(54) SYNERGISTIC COMBINATIONS OF NANO-SCALED FILLERS AND HINDERED AMINE LIGHT STABILIZERS

(75) Inventors: Hui Chin, Katonah, NY (US); Peter Shelsey Solera, Suffern, NY (US); Douglas Wayne Horsey, Briarcliff Manor, NY (US); Nikolas Kaprinidis, New York City, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/480,870

(22) PCT Filed: Jun. 20, 2002

(86) PCT No.: PCT/EP02/06847

§ 371 (c)(1),
(2), (4) Date: Aug. 13, 2004

(87) PCT Pub. No.: WO03/002651

PCT Pub. Date: Jan. 9, 2003

(65) Prior Publication Data

US 2005/0004294 A1 Jan. 6, 2005

Related U.S. Application Data

(60) Provisional application No. 60/302,125, filed on Jun. 29, 2001.

(51) Int. Cl.
*C08K 5/3412* (2006.01)
*C08K 3/34* (2006.01)

(52) U.S. Cl. .............. 524/99; 524/100; 524/102; 524/103; 524/445; 524/447

(58) Field of Classification Search .......... 524/99–100, 524/102–103, 445–447; 522/75–79
See application file for complete search history.

(56) References Cited

U.S. PATENT DOCUMENTS

| | | | | |
|---|---|---|---|---|
| 4,467,061 A | | 8/1984 | Yamamoto et al. | 524/87 |
| 4,981,730 A | * | 1/1991 | Zaleski | 427/393.5 |
| 6,087,433 A | * | 7/2000 | Hanada et al. | 524/492 |
| 6,103,805 A | * | 8/2000 | Kojima et al. | 524/442 |
| 6,146,557 A | * | 11/2000 | Inata et al. | 252/609 |
| 6,156,838 A | * | 12/2000 | Yoshikawa et al. | 524/789 |
| 6,344,506 B1 | * | 2/2002 | Vasseur | 524/91 |
| 6,353,037 B1 | * | 3/2002 | Thunhorst et al. | 521/64 |
| 6,387,981 B1 | * | 5/2002 | Zhang et al. | 523/117 |
| 6,423,768 B1 | * | 7/2002 | Khouri | 524/445 |
| 6,462,100 B1 | * | 10/2002 | Thunhorst et al. | 521/53 |
| 6,569,912 B1 | * | 5/2003 | Oohara et al. | 521/79 |
| 6,579,926 B1 | * | 6/2003 | Patel | 524/445 |
| 6,593,392 B1 | * | 7/2003 | Wang | 522/83 |
| 6,605,655 B1 | * | 8/2003 | Kato et al. | 523/203 |
| 6,653,394 B1 | * | 11/2003 | Meisenburg et al. | 524/589 |
| 6,747,091 B1 | * | 6/2004 | Baumgart et al. | 524/560 |
| 6,833,392 B1 | * | 12/2004 | Acquarulo et al. | 522/83 |
| 6,849,680 B1 | * | 2/2005 | Knudson et al. | 524/445 |
| 6,861,481 B1 | * | 3/2005 | Ding et al. | 525/424 |

FOREIGN PATENT DOCUMENTS

| | | |
|---|---|---|
| GB | 2247681 | 3/1992 |
| WO | 99/02590 | 1/1999 |
| WO | 99/41299 | 8/1999 |

OTHER PUBLICATIONS

Derwent Abstract 1990-181491 [25] for JP 02117934 (1990).
Patent Abstracts of Japan Publication No. 09078025 (1997).
R. Gächter et al., Plastics Additives Handbook, 4th Ed., pp. 525–591, (1990).

* cited by examiner

*Primary Examiner*—Peter Szekely
(74) *Attorney, Agent, or Firm*—Tyler A. Stevenson

(57) ABSTRACT

Polymer compositions comprising a polymeric substrate and an effective stabilizing amount of a synergistic mixture of a nano-scaled filler and at least one additive selected from the group consisting of the hindered amine light stabilizers are effectively stabilized against the deleterious effects of oxidative, thermal or light-induced degradation.

8 Claims, No Drawings

SYNERGISTIC COMBINATIONS OF NANO-SCALED FILLERS AND HINDERED AMINE LIGHT STABILIZERS

This is a 371 of PCT/EP02/06847, filed Jun. 20, 2002, which claims benefit of U.S. provisional application No. 60/302,125, filed Jun. 29, 2001.

The present invention relates to novel polymer compositions comprising a polymeric substrate, stabilized against the deleterious effects of oxidative, thermal or light-induced degradation, and an effective stabilizing amount of a synergistic mixture of a nano-scaled filler and at least one additive selected from the group consisting of the hindered amine light stabilizers.

The addition of fillers to organic materials, especially polymers, is known and is described for example in R. Gächter, H. Müller (Eds.), Plastics Additives Handbook, 3rd ed., pages 525–591, Hanser Publishers, Munich 1990. The use of fillers in polymers has the advantage that it is possible to bring about improvement in, for example, the mechanical properties, especially the density, hardness, rigidity or impact strength of the polymer. Since the fillers are often less expensive than the pure polymers, the replacement of part of the expensive pure polymers by fillers also leads to a reduction in the cost of the polymer.

With incorporation of nano-scaled fillers, the mechanical properties of polymers can be improved at a much lower concentration of 5 to 10% by weight compared to 20 to 50% by weight with the micro-scaled normal filler particles. Polymers containing nano-scaled fillers show improved surface qualities like gloss, lower tool wear at processing and better conditions for recycling.

Polymer compositions comprising nano-scaled fillers, or nanocomposites, exhibit properties such as good surface appearance, toughness, ductility and tensile strength. However, such polymer compositions do not have long-term stability equal to compositions that comprise traditional micro-scaled fillers. Long-term stability is for example measured by color change or gloss change on long-term aging under exposure to heat, oxygen and light.

WO-A-99/41299 is aimed at a polymer nanocomposite composition of a polyamide and a treated silicate.

WO-A-01/04197 discloses a polyamide composition comprising one or more polyamide polymers or copolymers, one or more layered clay materials, and one or more alkoxylated ammonium cations.

It has now been found that polymeric substrates are stabilized against the deleterious effects of oxidative, thermal or light-induced degradation by incorporation therein of an effective stabilizing amount of a synergistic mixture of a nano-scaled filler and at least one additive selected from the group consisting of the hindered amine light stabilizers. Surprisingly, polymer compositions comprising normal use levels of nano-scaled fillers and at least one additive selected from the group consisting of the hindered amine light stabilizers, upon long-term aging under exposure to heat and light, perform about as well as polymer compositions that comprise normal use levels of traditional micro-scaled fillers and at least one additive selected from the group consisting of the hindered amine light stabilizers.

The instant invention pertains to a polymer composition, stabilized against the deleterious effects of oxidative, thermal or light-induced degradation, which composition comprises
 (a) a polymer substrate,
 (b) at least one nano-scaled filler and
 (c) at least one additive selected from the group consisting of the hindered amine light stabilizers.

The polymer substrates of component (a) are natural or synthetic polymers or copolymers. The substrates of component (a) are for example synthetic polymers, in particular thermoplastic polymers such as polyamides and polyolefins. Polyolefins are for instance polypropylene or polyethylene.

Suitable polymer substrates of component (a) are for example:

1. Polymers of monoolefins and diolefins, for example polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
 a) radical polymerization (normally under high pressure and at elevated temperature).
 b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium (III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/ alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1.)–4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, SAN, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS. Polyesters and polyester copolymers as defined in U.S. Pat. No. 5,807,932 (column 2, line 53), incorporated herein by reference.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

32. Polysiloxanes such as the soft, hydrophilic polysiloxanes described, for example, in U.S. Pat. No. 4,259,467; and the hard polyorganosiloxanes described, for example, in U.S. Pat. No. 4,355,147.

33. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.

34. Radiation curable compositions containing ethylenically unsaturated monomers or oligomers and a polyunsaturated aliphatic oligomer.

35. Epoxymelamine resins such as light-stable epoxy resins crosslinked by an epoxy functional coetherified high solids melamine resin such as LSE-4103 (Monsanto).

The polymer substrates of component (a) are in particular selected from the group consisting of thermoplastic polymers, for example polyamides or polyolefins. Polyolefins are for instance polyethyelene and polypropylene.

A component (a) of special interest is a polyamide a thermoplastic polyolefin like for example polypropylene or polyethylene; ABS or high impact polystyrene (HIPS).

Nano-scaled fillers are also referred to as "nanoclays" are disclosed for example in U.S. Pat. Nos. 5,853,886 and 6,020,419, the relevant disclosures of which are hereby incorporated by reference.

Nano-scaled fillers of the present invention are for example phyllosilicates or smectite clays, for example organophilic phyllosilicates, naturally occuring phyllosilicates, synthetic phyllosilicates or a mixture of such phyllosilicates. The present nano-scaled fillers are for example montmorillonites, bentonites, beidellites, hectorites, saponites or stevensites.

For example, nano-scaled montmorillonites have a "platey" or platelet structure. The platelets generally have a thickness below about 2 nm. The platelets or particles generally have an average diameter between 20 and 30,000 nm, and a ratio of length to width of between 30,000:1 and 20:1. Commercially available nano-scaled montmorillonites of such structure are Nanomer® I.42E, available from Nanocor, and Cloisite® 30B, available from Southern Clay.

Nano-scaled fillers possess an extremely large surface with high surface energy. The deactivation of the surface energy and the compatibilization of the nano-scaled fillers with a polymer is therefore even more important than with a common micro-scaled filler in order to avoid coagulation and reach an excellent dispersion of the nano-scaled filled in the polymer. The nano-scaled fillers like the phyllosilicates are made organophilic by ion exchange, for example with alkylammonium salts. Such nano-scaled organophilic phyllosilicates are better swellable and easier to disperse in a polymer matrix.

Treated nano-scaled fillers are also referred to as "treated layered clay material" or "organoclay".

The nano-scaled filler of component (b) is present in the compositions of the present invention at a concentration of 0.5 to 10% by weight, based on the weight of component (a), for example, 1 to 9% by weight, for instance 3 to 7% by weight, for example 5% by weight, based on the weight of component (a).

The hindered amine light stabilizers (HALS) of component (c) are selected from the group consisting of hindered amines substituted on the N-atom by an alkoxy or cycloalkoxy moiety, hindered amines substituted on the N-atom by an alkoxy which is further substituted with an hydroxy group, and conventional hindered amines where the N-atom is substituted by hydrogen, alkyl, acyl and the like.

Alkoxy is a branched or straight chain radical having up to 25 carbon atoms, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy. Present alkoxy may have from 1 to 12, for instance from 1 to 8, e.g. from 1 to 6, carbon atoms.

Cycloalkoxy is for example $C_5$–$C_{12}$cycloalkoxy, for example cyclopentyloxy or cyclohexyloxy.

Alkyl is a branched or straight chain radical having up to 25 carbon atoms, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-tri-methylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

The hindered amines substituted on the N-atom by an alkoxy or a cycloalkoxy moiety are well known in the art. These are described in detail in U.S. Pat. No. 5,204,473, the relevant parts of which are incorporated herein by reference.

The hindered amines substituted on the N-atom by an alkoxy, cycloalkoxy or benzyloxy moiety which are useful in the instant invention include the following:

bis(1-octyloxy-2,2,6,6-tetramethylpiperidin-4-yl) sebacate;
bis(1-cyclohexyloxy-2,2,6,6-tetramethylpiperidin-4-yl) sebacate;
1-cyclohexyloxy-2,2,6,6-tetramethyl-4-octadecylaminopiperidine;
2,4-bis[(1-cyclohexyloxy-2,2,6,6-tetramethylpiperidin-4-yl) butylamino]-6-(2-hydroxyethyl-amino-s-triazine;
bis(1-cyclohexyloxy-2,2,6,6-tetramethylpiperidin-4-yl) adipate;
the oligomeric compound which is the condensation product of 4,4'-hexamethylenebis(amino-(1-octyloxy-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;
the oligomeric compound which is the condensation product of 4,4'-hexamethylenebis(amino-(1-cyclohexyloxy-2,2,6,6-tetramethylpiperidine)) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;
the oligomeric compound which is the condensation product of 4,4'-hexamethylenebis(amino-(1-propyloxy-2,2,6,6-tetramethylpiperidine)) and 2,4-dichloro-6-[(1-propyloxy-2,2,6,6-tetramethylpiperidin-4-yl)butylamino]-s-triazine end-capped with 2-chloro-4,6-bis(dibutylamino)-s-triazine (the n-propoxy derivative of the corresponding N—H hindered amine below);
the oligomeric compound which is the condensation product of 4,4'-hexamethylenebis(amino-(1-acetoyloxy-2,2,6,6-tetramethylpiperidine)) and 2,4-dichloro-6-[(1-acetoyloxy-2,2,6,6-tetramethylpiperidin-4-yl)butylamino]-s-triazine end-capped with 2-chloro-4,6-bis(dibutylamino)-s-triazine;
1-methoxy-4-hydroxy-2,2,6,6-tetramethylpiperidine;
1-octyloxy-4-hydroxy-2,2,6,6-tetramethylpiperidine;
1-cyclohexyloxy-4-hydroxy-2,2,6,6-tetramethylpiperidine;
1-methoxy-4-oxo-2,2,6,6-tetramethylpiperidine;
1-octyloxy-4-oxo-2,2,6,6-tetramethylpiperidine;
1-cyclohexyloxy-4-oxo-2,2,6,6-tetramethylpiperidine;
bis(1-heptyloxy-2,2,6,6-tetramethylpiperidin-4-yl) sebacate;
bis(1-nonyloxy-2,2,6,6-tetramethylpiperidin-4-yl) sebacate;
bis(1-dodecyloxy-2,2,6,6-tetramethylpiperidin-4-yl) sebacate;
N,N',N'',N'''-tetrakis[(4,6-bis(butyl-1-octyloxy-2,2,6,6-pentamethylpiperidin-4-yl)-amino-s-triazin-2-yl]-1,10-diamino-4,7-diazadecane; and

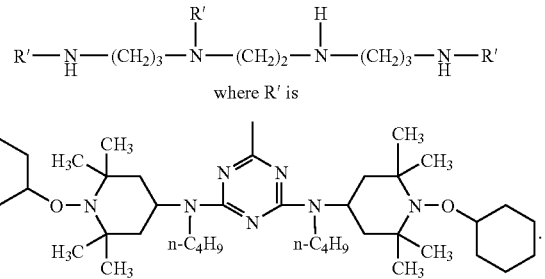

This specific hydrocarbyloxy hindered amine stabilizer, CAS # 191680-81-6, is described in U.S. Pat. No. 5,844,026.

The hindered amines substituted on the N-atom by a hydroxy-substituted alkoxy moiety which are useful in the instant invention include the following:

1-(2-hydroxy-2-methylpropoxy)-4-octadecanoyloxy-2,2,6,6-tetramethylpiperidine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
bis(1-(2-hydroxy-2-methylpropoxy)-2,2,6,6-tetramethylpiperidin-4-yl) sebacate;
bis(1-(2-hydroxy-2-methylpropoxy)-2,2,6,6-tetramethylpiperidin-4-yl) adipate;
bis(1-(2-hydroxy-2-methylpropoxy)-2,2,6,6-tetramethylpiperidin-4-yl) succinate;
bis(1-(2-hydroxy-2-methylpropoxy)-2,2,6,6-tetramethylpiperidin-4-yl)glutarate; and
2,4-bis{N-[1-(2-hydroxy-2-methylpropoxy)-2,2,6,6-tetramethylpiperidin-4-yl]-N-butylamino}-6-(2-hydroxyethylamino)-s-triazine.

Conventional hindered amines useful in the present invention include the following:

the oligomeric compound which is the condensation product of 4,4'-hexamethylenebis-(amino-(2,2,6,6-tetramethylpiperidine)) and 2,4-dichloro-6-[(2,2,6,6-tetramethylpiperidin-4-yl)butylamino]-s-triazine end-capped with 2-chloro-4,6-bis(dibutylamino)-s-triazine;
bis(2,2,6,6-tetramethylpiperidin-4-yl) sebacate;
polycondensation product of 2,4-dichloro-6-tert-octylamino-s-triazine and 4,4'-hexamethylenebis(amino-2,2,6,6-tetramethylpiperidine);
polycondensation product of 1-(2-hydroxyethyl)-2,2,6,6-tetramethyl-4-hydroxypiperidine and succinic acid;
polycondensation product of 4,4'-hexamethylenebis(amino-2,2,6,6-tetramethylpiperidine) and 1,2-dibromoethane;
mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine);
mixture of the polycondensation product of 1-(2-hydroxyethyl)-2,2,6,6-tetramethyl-4-hydroxypiperidine and succinic acid with the polycondensation product of 2,4-dichloro-6-tert-octylamino-s-triazine and 4,4'-hexamethylenebis(amino-2,2,6,6-tetramethylpiperidine);
bis(1,2,2,6,6-pentamethylpiperidin-4-yl) sebacate;
di(1,2,2,6,6-pentamethylpiperidin-4-yl) (3,5-di-tert-butyl-4-hydroxybenzyl)butylmalonate;
4-benzoyl-2,2,6,6-tetramethylpiperidine;
4-stearyloxy-2,2,6,6-tetramethylpiperidine;
tris(2,2,6,6-tetramethylpiperidin-4-yl) nitrilotriacetate;

tetrakis(2,2,6,6-tetramethylpiperidin-4-yl) 1,2,3,4-butane-tetracarboxylate;
tetrakis(1,2,2,6,6-pentamethylpiperidin-4-yl) 1,2,3,4-butanetetracarboxylate;
polycondensation product of 2,4-dichloro-6-morpholino-s-triazine and 4,4'-hexamethylenebis(amino-2,2,6,6-tetramethylpiperidine);
polycondensation product of 2,4-dichloro-6-morpholino-s-triazine and 4,4'-hexamethylenebis(amino-(1-methyl-2,2,6,6-tetramethylpiperidine));
N,N',N",N"'-tetrakis[(4,6-bis(butyl-1,2,2,6,6-pentamethylpiperidin-4-yl)-amino-s-triazin-2-yl]-1,10-diamino-4,7-diazadecane;
octamethylene bis(2,2,6,6-tetramethylpiperidin-4-carboxylate);
N-2,2,6,6-tetramethylpiperidin-4-yl-n-dodecylsuccinimide;
N-1,2,2,6,6-pentamethylpiperidin-4-yl-n-dodecylsuccinimide;
N-1-acetyl-2,2,6,6-tetramethylpiperidin-4-yln-dodecylsuccinimide;
4-$C_{15}$–$C_{17}$alkanoyloxy-2,2,6,6-tetramethylpiperidine;
polycondensation product of 2,4-dichloro-6-cyclohexylamino-s-triazine and 4,4'-hexamethylenebis(amino-2,2,6,6-tetramethylpiperidine);
1,5-bis(2,2,6,6-tetramethylpiperidin-4-yl)-1,5-diaza-4-oxo-propane;
copolymer of methyl methracrylate, ethyl acrylate and 2,2,6,6-tetramethylpiperidin-4-yl acrylate;
copolymer of N-octadecylmaleimide, styrene and N-(2,2,6,6-tetramethylpiperidin-4yl)maleimide;
1,3,5-tris[3-(2,2,6,6-piperidin-4-ylamino)-2-hydroxy-propyl)isocyanurate;
olefin copolymer containing units derived from N-[2-(2,2,6,6-tetramethylpiperidin-4-yl)oxalamid-1-yl]maleimide;
2,2,4,4-tetramethyl-7-oxa-3,20-diaza-21-oxo-dispiro[5,1,11,2]heneicosane;
$C_{12}$–$C_{14}$alkyl 3-(2,2,4,4-tetramethyl-7-oxa-3,20-diaza-21-oxo-dispiro[5,1,11,2]heneicosane-20-yl)propionate;
reaction product of epichlorohydrin and 2,2,4,4-tetramethyl-7-oxa-3,20-diaza-21-oxo-dispiro[5,1,11,2]heneicosane;
1,3-di(2,2,6,6-tetramethylpiperidin-4-yl) 2,4-ditridecyl butanetetracarboxylate;
1,3-di(1,2,2,6,6-pentamethylpiperidin-4-yl) 2,4-ditridecyl butanetetracarboxylate;
polycondensation product of 3,9-bis(1,1-dimethyl-2-hydroxyethyl)-2,4,8,10-tetraoxaspiro[5.5]-undecane, tetramethyl 1,2,3,4-butanetetra-carboxylate and 2,2,6,6-tetramethyl-4-hydroxypiperidine;
polycondensation product of 3,9-bis(1,1-dimethyl-2-hydroxyethyl)-2,4,8,10-tetraoxaspiro[5.5]-undecane, tetramethyl 1,2,3,4-butanetetra-carboxylate and 1,2,2,6,6-pentamethyl-4-hydroxypiperidine;
1,4-bis(2,2,6,6-tetramethylpiperidin-4-yl)-2,2-dimethyl-1,4-diaza-4-oxopropane;
reaction product of 4-amino-2,2,6,6-tetramethylpiperidine and tetramethylolacetylenediurea;
1,6-hexamethylenebis[N-formyl-N-(2,2,6,6-tetramethylpipeidin-4-yl)amine];
copolymer of N-(2,2,6,6-tetramethylpiperdin-4-yl)maleimide and a $C_{20}$–$C_{24}$-alpha-olefin;
poly[3-(2,2,6,6-tetramethylpiperidin-4-yloxy)propyl-methyl-siloxane];
polycondensation product of 2,4-dichloro-6-[N-butyl-N-(2,2,6,6-tetramethylpiperidin-4-yl)amino]-s-triazine and 1,10-diamino-4,7-diazadecane;
dodecyl 3-(2,2,4,4-tetramethyl-7-oxa-3,20-diaza-21-oxo-dispiro[5,1,11,2]heneicosane-20-yl)propionate;

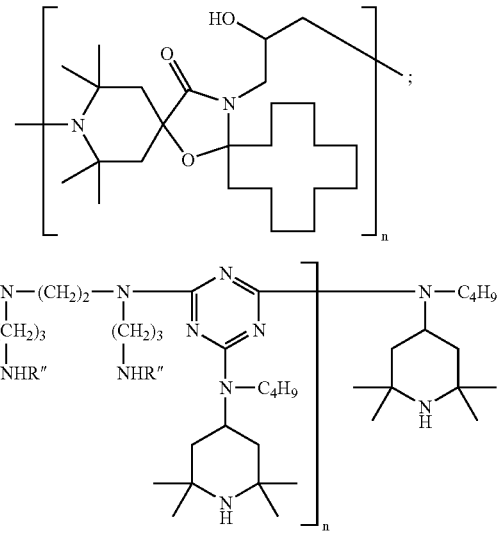

where R' = R" or H

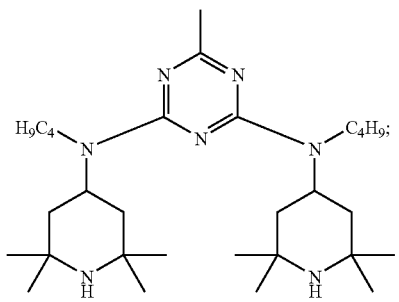

and where R" = n is a number from the range from 2 to 200; and

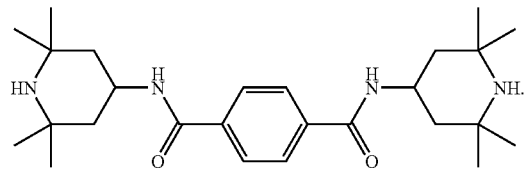

For instance, the hindered amines useful in the present invention include:

the oligomeric compound which is the condensation product of 4,4'-hexamethylenebis(amino-(1-propyloxy-2,2,6,6-tetramethylpiperidine)) and 2,4-dichloro-6-[(1-propyloxy-2,2,6,6-tetramethylpiperidin-4-yl)butylamino]-s-triazine end-capped with 2-chloro-4,6-bis(dibutylamino)-s-triazine (the n-propoxy derivative of the corresponding N—H hindered amine below);

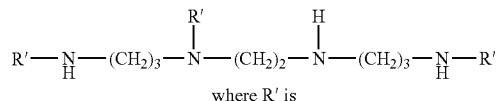

where R' is

-continued

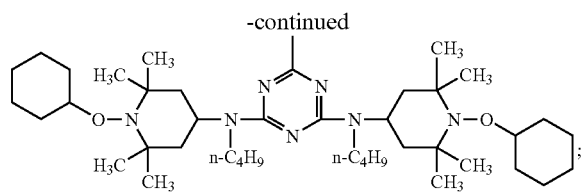

the oligomeric compound which is the condensation product of 4,4'-hexamethylenebis(amino-(2,2,6,6-tetramethylpiperidine)) and 2,4-dichloro-6-[(2,2,6,6-tetramethylpiperidin-4-yl)butylamino]-s-triazine end-capped with 2-chloro-4,6-bis(dibutylamino)-s-triazine;

bis(2,2,6,6-tetramethylpiperidin-4-yl) sebacate;

polycondensation product of 2,4-dichloro-6-tert-octylamino-s-triazine and 4,4'-hexamethylenebis(amino-2,2,6,6-tetramethylpiperidine);

polycondensation product of 1-(2-hydroxyethyl)-2,2,6,6-tetramethyl-4-hydroxypiperidine and succinic acid;

mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine);

mixture of the polycondensation product of 1-(2-hydroxyethyl)-2,2,6,6-tetramethyl-4-hydroxypiperidine and succinic acid with the polycondensation product of 2,4-dichloro-6-tert-octylamino-s-triazine and 4,4'-hexamethylenebis(amino-2,2,6,6-tetramethylpiperidine);

bis(1,2,2,6,6-pentamethylpiperidin-4-yl) sebacate;

di(1,2,2,6,6-pentamethylpiperidin-4-yl) (3,5-di-tert-butyl-4-hydroxybenzyl)butylmalonate;

polycondensation product of 2,4-dichloro-6-morpholino-s-triazine and 4,4'-hexamethylenebis(amino-2,2,6,6-tetramethylpiperidine);

polycondensation product of 2,4-dichloro-6-morpholino-s-triazine and 4,4'-hexamethylenebis(amino-(1-methyl-2,2,6,6-tetramethylpiperidine));

N,N',N'',N'''-tetrakis[(4,6-bis(butyl-1,2,2,6,6-pentamethylpiperidin-4-yl)-amino-s-triazin-2-yl]1,10-diamino-4,7-diazadecane;

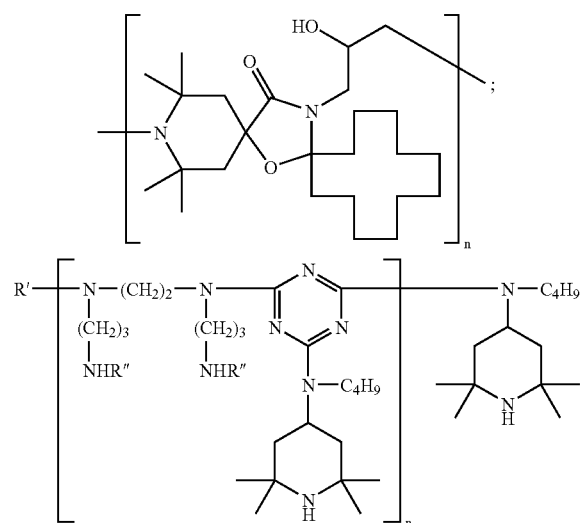

where R' = R'' or H

-continued

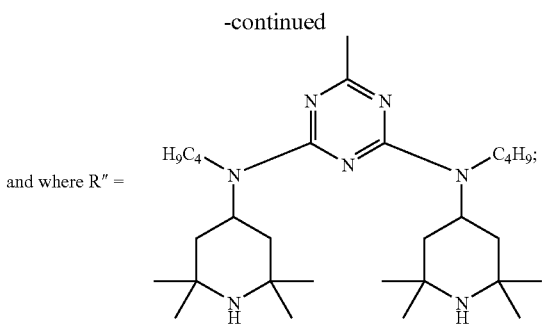

and where R'' =

$n$ is a number from the range from 2 to 200; and

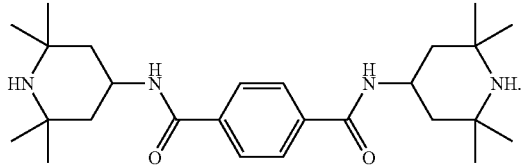

Preferably, component (c) is a 1:1 mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine).

It is contemplated that mixtures of the N-alkoxy or cyclohexyloxy substituted hindered amines; mixtures of the N-hydroxy-alkoxy substituted hindered amines; and mixtures of these two types of hindered amines can be used in the instant invention. Indeed, mixtures of these types of hindered amines along with conventional hindered amines where the N-atom is substituted by hydrogen, alkyl, acyl and the like are also contemplated as being useful in this invention.

Additionally, the stabilized composition may also include at least one stabilizer selected from the group consisting of additional hindered amine light stabilizers, ultraviolet light absorbers, phenolic antioxidants, organic phosphorus stabilizers, aminic antioxidants, hydroxylamine stabilizers, nitrone stabilizers, benzofuranone stabilizers and amine oxide stabilizers.

Accordingly, the instant invention also pertains to a polymer composition, stabilized against the deleterious effects of oxidative, thermal or light-induced degradation, which composition comprises (a) a polymer substrate,
(b) at least one nano-scaled filler,
(c) at least one additive selected from the group consisting of the hindered amine light stabilizers, and
(d) at least one additive selected from the group consisting of additional hindered amine light stabilizers, ultraviolet light absorbers, phenolic antioxidants, organic phosphorus stabilizers, aminic antioxidants, hydroxylamine stabilizers, nitrone stabilizers, benzofuranone stabilizers and amine oxide stabilizers.

The ultraviolet light absorbers (UVA's or UV absorbers), of component (d) are for example selected from the group consisting of benzotriazole, benzophenone, α-cyanoacrylate, oxanilide, s-triazine, cinnamate, malonate, benzoate, salicylate and benzoxazin-4-one ultraviolet light absorbers.

The UV absorbers of component (d) are for example selected from the group consisting of benzotriazole, benzophenone and s-triazine ultraviolet light absorbers.

The UV absorbers are well known in the field of stabilization of substrates from degradation caused by exposure to actinic radiation. Examples of UV absorbers which may be used in the present invention include the following:
a) 4-octyloxy-2-hydroxybenzophenone;
b) 4-methoxy-2-hydroxybenzophenone;
c) 2-(2-hydroxy-5-methylphenyl)-2H-benzotriazole;
d) 2-(2-hydroxy-5-tert-octylphenyl-2H-benzotriazole;
e) 2-(2-hydroxy-3,5-di-tert-amylphenyl)-2H-benzotriazole;
f) octyl 3-(benzotriazol-2-yl)-5-tert-butyl-4-hydroxyhydrocinnamate;
g) 2-(2-hydroxy-3,5-di-tert-butylphenyl)-2H-benzotriazole;
h) 2-(2-hydroxy-5-tert-butylphenyl)-2H-benzotriazole;
i) 5-chloro-2-(2-hydroxy-3,5-di-tert-butylphenyl)-2H-benzotriazole;
j) 5-chloro-2-(2-hydroxy-3-tert-butyl-5-methylphenyl)-2H-benzotriazole;
k) 2-(2-hydroxy-3-sec-butyl-5-tert-butylphenyl)-2H-benzotriazole;
l) 2-(2-hydroxy-4-octyloxyphenyl)-2H-benzotriazole;
m) 2-(2-hydroxy-3-dodecyl-5-methylphenyl)-2H-benzotriazole;
n) 2-[2-hydroxy-3,5-di($\alpha,\alpha$-dimethylbenzyl)phenyl]-2H-benzotriazole;
o) 2-[2-hydroxy-3-($\alpha,\alpha$-dimethylbenzyl)-5-tert-octylphenyl]-2H-benzotriazole;
p) 2-{(2-hydroxy-3-tert-butyl-5-[2-(omega-hydroxy-octa(ethyleneoxy)carbonyl)ethyl]phenyl}-2H-benzotriazole;
q) 2-{2-hydroxy-3-tert-butyl-5-[2-(octyloxy)carbonyl)ethyl]phenyl}-2H-benzotriazole;
r) 2-ethylhexyl p-methoxycinnamate;
s) 4-methoxy-2,2'-dihydroxybenzophenone;
t) 4,4'dimethoxy-2,2'-dihydroxybenzophenone;
u) 2,4-bis(2,4-dimethylphenyl)-6-(2-hydroxy-4-octyloxyphenyl)-s-triazine;
v) 2,4-diphenyl-6-(2-hydroxy-4-hexyloxyphenyl)-s-triazine;
w) 2,4-bis(2,4-dimethylphenyl)-6-[2-hydroxy-4-(3-tridecyloxy-2-hydroxypropoxy)phenyl]-s-triazine; and
x) 2,4-bis(2,4-dimethylphenyl)-6-[2-hydroxy-4-(3-tridecyloxy-2-hydroxypropoxy)-5-$\alpha$-cumylphenyl]-s-triazine.

In another embodiment, the UV absorber is
a) 4-octyloxy-2-hydroxybenzophenone;
b) 4-methoxy-2-hydroxybenzophenone;
d) 2-(2-hydroxy-5-tert-octylphenyl-2H-benzotriazole;
o) 2-[2-hydroxy-3-($\alpha,\alpha$-dimethylbenzyl)-5-tert-octylphenyl]-2H-benzotriazole;
p) 2-{2-hydroxy-3-tert-butyl-5-[2-(omega-hydroxy-octa(ethyleneoxy)carbonyl)ethyl]phenyl}-2H-benzotriazole; or
q) 2-{2-hydroxy-3-tert-butyl-5-[2-(octyloxy)carbonyl)ethyl]phenyl}-2H-benzotriazole.

Hydroxylamine stabilizers are disclosed for example in U.S. Pat. Nos. 4,590,231; 4,612,393; 4,649,221; 4,668,721; 4,691,015; 4,696,964; 4,703,073; 4,720,517; 4,757,102; 4,782,105; 4,831,134; 4,876,300; 5,006,577; 5,019,285; 5,064,883; 5,185,448 and 5,235,056.

Nitrone stabilizers are described in U.S. Pat. No. 4,898,901.

A specific amine oxide is for example Genox™ EP, a di($C_{16}$–$C_{18}$)alkyl methyl amine oxide, CAS# 204933-93-7.

For example U.S. Pat. Nos. 4,666,962; 4,666,963; 4,678,826; 4,753,972; 4,757,102; 4,760,179; 4,929,657; 5,057,563; 5,021,479; 5,045,583 and 5,185,448 disclose the use of various substituted hydroxylamine stabilizers towards the stabilization of organic materials.

For example U.S. Pat. Nos. 5,081,300; 5,162,408; 5,844,029; 5,880,191 and 5,922,794 disclose saturated hydrocarbon amine oxide stabilizers.

The benzofuranone stabilizers are those disclosed for example in U.S. Pat. Nos. 4,325,863; 4,338,244; 5,175,312; 5,216,052; 5,252,643; 5,369,159; 5,488,117; 5,356,966; 5,367,008; 5,428,162; 5,428,177; 5,614,572; 5,883,165 or 5,516,920, all incorporated herein by reference, or 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

Examples of such antioxidants and hydroxylamines include the following:
4,4'-di-α-cumyl-diphenylamine (CAS # 10081-67-1)
mono- and dialkylated tert-butyl/tert-octyl-diphenylamines (IRGANOX® L57),
n-octadecyl 3,5-di-tert-butyl-4-hydroxyhydrocinnamate,
neopentanetetrayl tetrakis(3,5-di-tert-butyl-4-hydroxyhydrocinammate),
di-n-octadecyl 3,5-di-tert-butyl-4-hydroxybenzylphosphonate,
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocynurate,
1,1,3-tris(2-methyl-4-hydroxy-5-tert-butylphenyl)butane,
1,3,5-tris[2-(3,5-di-tert-butyl-4-hydroxyhydrocinnamoyloxy)ethyl]isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N'-bis[2-(3,5-di-tert-butyl-4-hydroxyhydrocinnamoyloxy)-ethyl]oxamide, and
N,N-dialkylhydroxylamine prepared from di(hydrogenated tallow)amine by direct oxidation.

For example, the phenolic antioxidant is
neopentanetetrayl tetrakis(3,5-di-tert-butyl-4-hydroxyhydrocinnamate),
n-octadecyl 3,5-di-tert-butyl-4-hydroxyhydrocinnamate,
1,3,5-trimethyl-2,4,6-tris(3,5-di-tert-butyl-4-hydroxybenzyl)benzene,
1,3,5-tris(3,5-di-tert-butyl-4-hydroxybenzyl)isocyanurate, 2,6-di-tert-butyl-p-cresol or
2,2'-ethylidene-bis(4,6-di-tert-butylphenol).

The effective amount of component (c), in combination with the optional stabilizers selected from additional hindered amine light stabilizers, ultraviolet light absorbers, phenolic antioxidants, organic phosphorus stabilizers, aminic antioxidants, hydroxylamine stabilizers, nitrone stabilizers, benzofuranone stabilizers and amine oxide stabilizers, in the present compositions is 0.01 to 10% by weight based on the weight of component (a); for example 0.1 to 2% by weight based on the polymer of component (a), for instance 0.1 to 1.0% by weight based on component (a).

Further in addition to component (b), the present stabilized compositions may comprise other traditional additives selected from, for example, other antioxidants, other UV absorbers, other hindered amines, other phosphites or phosphonites, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like, such as the materials listed below, or mixtures thereof. These optional further additives are present from 0.01 to 10% by weight; preferably from 0.025 to 5% by weight, and most preferably from 0.1 to 3% by weight, based on the total weight of the composition.

These other traditional additives are selected from, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butyl-benzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzylphosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyrylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed, for example in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987; 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-tert-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy) carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H- benzotriazole, 2-(3-tert-butyl-2-hydroxy-5-(2-isooctyloxy-carbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2, 3, 4-butane-tetracarboxylat 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described for example in GB-A-2 301 106 as component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on pages 68 to 73 of said GB-A-2 301 106.

The sterically hindered amine may also be one of the compounds described for example in EP-A-0 782 994, for example compounds as described in claims 10 or 38 or in Examples 1 to 12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from tert-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,5'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, WO-A-96/28431; EP-A-0 434 608, EP-A-0 941 989; GB-A-2 317 893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704; for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[(2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonyl-isopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphospho bis(2,4-di-tert-butyl-6-methylphenyl) methyl phosphite, bis(2,4-di-tert-butyl-6-methylphenyl) ethyl phosphite, 2,2',2''-nitrilo[triethyltris(3,3',5,5'-tetra-tert-butyl-1,1'-biphenyl-2,2'-diyl)phosphite], 2-ethylhexyl(3,3',5,5'-tetra-tert-butyl-111'-biphenyl-2,2'-diyl)phosphite.

Especially preferred are the following phosphites:
Tris(2,4-di-tert-butylphenyl) phosphite (Irgafos®168, Ciba Specialty Chemicals Corp.), tris(nonylphenyl) phosphite,

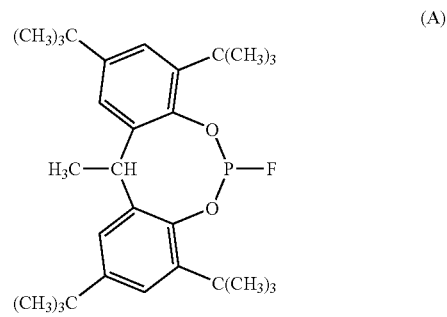
(A)

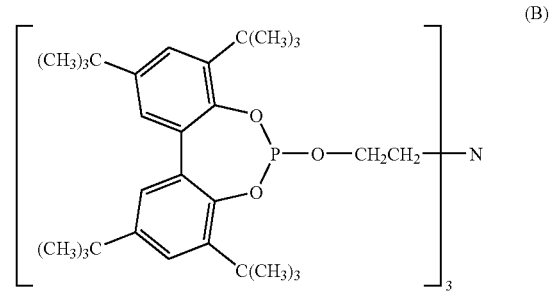
(B)

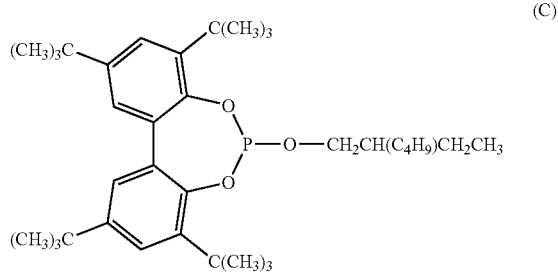
(C)

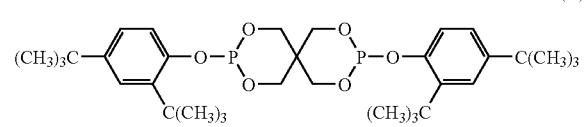
(D)

-continued

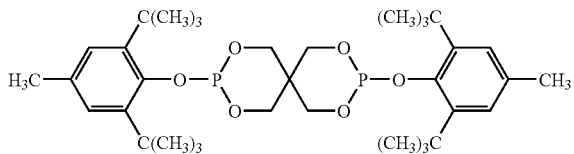

(E)

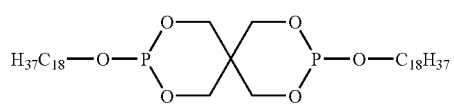

(F)

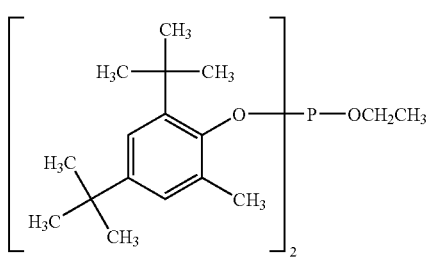

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N-methyl-N-octadecylhydroxylamine and the N,N-dialkylhydroxylamine derived from hydrogenated tallow amine.

6. Nitrones, for example N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191; didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863; 4,338,244; 5,175,312; 5,216,052; 5,252,643; DE-A-4 316 611; DE-A-4 316 622; DE-A-4 316 876; EP-A-0 589 839 or EP-A-0 591 102 or 3-(4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one [Irganox® HP-136, Ciba Specialty Chemicals Corp.], and 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese, for example CuI.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

15. Dispersing Agents, such as polyethylene oxide waxes or mineral oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600-59-4), and blowing agents.

The nano-scaled fillers of component (b) and the additives of component (c), as well as further optional additives, may be incorporated into the polymeric substrate according to methods known to those skilled in the art.

The nano-scaled fillers of component (b), additives of component (c), and optional further additives may be added to the polymer to be stabilized either separately or together.

The compositions of this invention, comprising nano-scaled fillers, are referred to as "nanocomposites". A nanocomposite is a polymer which has dispersed therein a plurality of individual nano-scaled filler particles. In the art, such particles are referred to as platelet particles or platelets or aggregates of platelets. It is desirable to have a high degree of dispersion of platelet particles, that is large separation of the particles.

The nano-scaled fillers may be incorporated into the polymeric substrate, that is the present nanocomposites may be prepared, by known means.

For example, a thermoplastic, for instance a polyamide, may be dry-mixed with the nano-scaled filler and melt compounded with an extruder or a batch mixer. Likewise, the nano-scaled filler may be added to the molten polymer in a mixing device. The nano-scaled filler may be added neat or in the form of a masterbatch or concentrate in a polymeric carrier. Generally, the polymer melt is mixed under conditions (shearing action) so as to produce a desired high degree of filler particle dispersion.

If desired, a dispersion aid or expanding agent may be present during the formation of the nanocomposite. Dispersion aids are known, for example water, oligomeric polymers, water dispersible polymers, and certain organic compounds.

Optionally, additional processing steps may be performed on the nanocomposite, for example in order to increase the molecular weight of the polymer or to alter the dispersion of the nano-scaled fillers. Steps include solid state polymerization, heat treatment, or treatment with known molecular weight increasing agents such as chain extension agents or crosslinking agents.

The present stabilizers of component (c) of this invention and optional further additives may be applied to or incorporated in the polymeric substrate either separately or together with the nano-scaled filler, by any known methods, e.g. by melt blending, solution blending, solution casting and adsorption from solution.

For example, additives of component (c) and optional further additives may be incorporated in the polymeric substrate before or after molding or also by applying the dissolved or dispersed additive mixture to the polymeric substrate, with or without subsequent evaporation of the solvent. Additives of component (c) and optional further additives can also be added to the polymeric substrate in the form of a masterbatch which contains these components in a concentration of, for example, about 2.5% to about 50% by weight.

For example, the additives of component (c), optional further additives and the polymeric substrate may all be dissolved in a mutually compatible solvent wherein the concentration of polymer in the solvent ranges from about 5 to about 50% by weight of the solvent. The solution may then be dried at an appropriate temperature to produce a cast film containing a blend of polymer and the additive(s).

Alternatively, additive compounds of component (c) and optional further additives are blended into a polymeric substrate by dissolving the additive(s) in a volatile solvent to provide a solution with an additive concentration of 5 to 50% by weight. The solution is then mixed with the polymer and the mixture is dried thereby providing polymer particles which are substantially evenly coated with additive(s). The coated polymer particles may then be fed to an extruder wherein the mixture is melt blended and extruded to produce an extrudate containing the polymeric substrate and additive(s).

If in a liquid form, the stabilizers of component (c) may be applied directly to polymer particles by stirring the polymer particles in the liquid additive mixture until the additive mixture is evenly dispersed on the surface of the polymer particles. The polymer may then be fed to an extruder to produce an extrudate of polymer substrate containing the additives.

The compositions of this invention may also be prepared by submitting the stabilizers of component (c), optional further additives and solid polymeric material to an extruder followed by melt blending and extruding the molten mixture. Alternatively, the polymeric material and additives may be melt blended in a thermostatted vessel where the components are in molten form, followed by cooling of the mixture.

Component (c) and optional further additives can also be added before or during the polymerization or before crosslinking.

Component (c) and optional further additives can be incorporated into the polymeric substrate in pure form or encapsulated in waxes, oils or polymers.

Component (c) and optional further additives can also be sprayed or coated onto the polymeric substrate. It may be used to dilute other additives (for example the conventional additives indicated above) or their melts so that it can be sprayed or coated together with these additives onto the polymeric substrate. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply component (c) optionally together with other additives, by spraying.

For instance, component (c) and optional further additives are incorporated into the polymeric substrate of component (c) by melt blending.

Compositions of the present invention can be used in various forms, for example as films, fibers, ribbons, molded materials, profiles or as binders for paints, adhesives or cement.

The present invention also provides for a process for effectively stabilizing a polymeric substrate subject to the deleterious effects of oxidative, thermal or light-induced degradation, which process comprises incorporating therein an effective stabilizing amount of
    (b) at least one nano-scaled filler, and
    (c) at least one additive selected from the groups consisting of the hindered amine light stabilizers.

A preferred embodiment of the present invention is therefore the use of components (b) and (c) as stabilizers for polymeric substrates against oxidative, thermal or light-induced degradation.

Synergistic effects are also observed, as measured by low color formation, with combinations of nano-scaled fillers and photoinitiators in radiation curable compositions. Low color formation is observed upon curing as well as upon long-term aging under exposure to oxygen, heat and light.

Accordingly, the present invention also is aimed at a composition comprising
    (a) at least one ethylenically unsaturated polymerizable compound or cationically polymerizable compound,
    (b) at least one nano-scaled filler, and
    (c) at least one photoinitiator suitable for curing ethylenically unsaturated polymerizable compounds or cationically polymerizable compounds.

The suitable photoinitiators are for example selected from the group consisting of the benzophenones, $\alpha$-activated acetophenones, bisacylphosphinoxides (BAPO), monoacylphosphinoxides (MAPO), alkoxamines, thioxanthones, benzoins, benzil ketals, benzoin ethers, $\alpha$-hydroxy-alkylphenones and $\alpha$-aminoalkylphenones.

Cationically curable (polymerizable) are for example epoxies and epoxy/acrylate hybrids.

The present invention is also aimed at a process for curing ethylenically unsaturated polymerizable compounds or cationically polymerizable compounds, which process comprises adding to said compounds
    (b) at least one nano-scaled filler, and
    (c) at least one photoinitiator suitable for curing ethylenically unsaturated polymerizable compounds or cationically polymerizable compounds, and irradiating the mixture so obtained with ultraviolet radiation or daylight or with light sources equivalent to daylight.

A preferred embodiment of the present invention is therefore the use of components (b) and (c) as photoinitiators for curing ethylenically unsaturated polymerizable compounds or cationically polymerizable compounds with ultraviolet radiation or daylight or with light sources equivalent to daylight.

synthetic polymers, especially thermoplastic polymers, against oxidative, thermal or light-induced degradation.

The present photochemically cured compositions (nano-composites) are suitable as pigmented or clear gel coats. They are suitable for thin coatings prepared by UV curing.

Synergistic effects are also observed towards flame-retardant properties of polymer compositions comprising N-alkoxy hindered amines and nano-scaled fillers. Accordingly, these flame-retardant compositions are also a subject of the present invention.

The instant invention also pertains to a flame retardant polymer composition which comprises
(a) a polymer substrate,
(b) at least one nano-scaled filler, and
(c) at least one compound selected from the group consisting of hindered amine stabilizers substituted on the N-atom by an alkoxy, hindered amine stabilizers substituted on the N-atom by a cycloalkoxy moiety, and hindered amine stabilizers substituted on the N-atom by an alkoxy which is further substituted with an hydroxy group.

The present flame-retardant compositions may further comprise traditional flame retardants.

Accordingly, the instant invention also pertains to a flame retardant polymer composition which comprises
(a) a polymer substrate,
(b) at least one nano-scaled filler,
(c) at least one compound selected from the group consisting of hindered amine stabilizers substituted on the N-atom by an alkoxy, hindered amine stabilizers substituted on the N-atom by a cycloalkoxy moiety, and hindered amine stabilizers substituted on the N-atom by an alkoxy which is further substituted with an hydroxy group, and
(d) at least one compound selected from the group consisting of brominated flame retardants, phosphorus containing flame retardants and inorganic flame retardants.

The hindered amines of the present flame-retardant compositions are as described herein. It is for example, of the formula

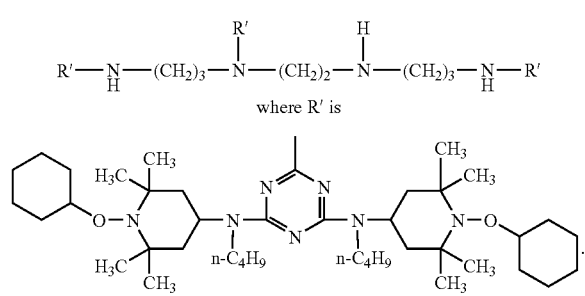

This specific hydrocarbyloxy hindered amine stabilizer, CAS # 191680-81-6, is described in U.S. Pat. No. 5,844,026, the disclosure of which is hereby incorporated by reference. Other hydrocarbyloxy hindered amine stabilizers disclosed in U.S. Pat. No. 5,844,026 and products-by-process disclosed therein, are also suitable in the present flame-retardant compositions.

The traditional flame retardant component of the present flame retardant compositions, component (d), is for example at least one compound selected from the group consisting of tetraphenyl resorcinol diphosphite (FYROLFLEX®RDP, Akzo Nobel); chloroalkyl phosphate esters (ANTIBLAZE® AB-100, Albright & Wilson; FYROL® FR-2, Akzo Nobel); polybrominated diphenyl oxide (DE-60F, Great Lakes Corp.); decabromodiphenyl oxide (DBDPO; SAYTEX® 102E); antimony trioxide ($Sb_2O_3$); antimony pentoxide ($Sb_2O_5$); tris[3-bromo-2,2-bis(bromomethyl)propyl] phosphate (PB 370®, FMC Corp.); triphenyl phosphate; bis(2, 3-di-bromopropyl ether) of bisphenol A (PE68); ammonium polyphosphate (APP) or (HOSTAFLAM® AP750); resorcinol diphosphate oligomer (RDP); brominated epoxy resin; ethylene-bis(tetrabromophthalimide) (SAYTEX® BT-93); bis(hexachlorocyclopentadieno)cyclooctane (DECLORANE PLUS®); calcium sulfate; chlorinated paraffins; magnesium carbonate; melamine phosphates; melamine pyrophosphates; molybdenum trioxide; zinc oxide; 1,2-bis (tribromophenoxy)ethane (FF680); tetrabromo-bisphenol A (SAYTEX® RB100); magnesium hydroxide; alumina trihydrate; zinc borate; ethylenediamine diphosphate (EDAP); silica; silicones; calcium silicate; magnesium silicate and ethylene bis-(dibromo-norbornanedicarboximide), (SAYTEX® BN-451).

The following Examples illustrate the invention in more detail. They are not to be construed as limiting the instant invention in any manner whatsoever. The invention is declared to cover all changes and modifications of the specific examples which do not constitute departure from the spirit and scope of the invention. Unless otherwise noted, parts and percentages are by weight.

EXAMPLE 1

Stabilized Polyamide

The additives and clays are extrusion compounded into polyamide-6,6 polymer with a Leistritz 27 mm twin screw extruder; processing temperatures are 246° C., 260° C., 260° C., with a die temperature of 260° C. Injection molded plaques (50.8 mm×50.8 mm×1.5 mm) are prepared on a BOY 50 machine, barrel temperature 265–275° C., nozzle temperature is 275° C. Accelerated weathering utilized an Atlas CI-65 xenon arc weatherometer (XAW), operated in either interior auto (SAE J1885) or exterior auto (SAE J1960) conditions. Both methods utilize a xenon arc weatherometer operated at high irradiance (0.55 W/m$^2$) and temperature (black panel 89° C. for SAE J1885, 70° C. for SAE J1960). A significant difference between these methods is the use of a water spray during part of the operating cycle with SAE J1960.

Color measurements are made with a DCI SF600 spectrophotometer operated at 10 degree, large area view, specular included per ASTM D1925.

Formulations 1–4 contain the following additives in percent by weight based on polyamide:
1) unstabilized.
2) 0.25% Tinuvin® 770, 0.25% Chimassorb® 944, 0.125% Irganox® 1098, 0.125% Irgafos® 168.
3) 5.0% Nanomer® I.42E.
4) 0.25% Tinuvin® 770, 0.25% Chimassorb® 944, 0.125% Irganox® 1098, 0.125% Irgafos® 168 and 5.0% Nanomer® I.42E.

The combination of hindered amine stabilizers, Tinuvin® 770 and Chimassorb® 944, are representative of hindered amine stabilizers that may be use for thermoplastics stabilization.

Delta E results for exterior xenon exposure (SAE J1960) are found in the table below:

| Formulation | Exposure (kJ/m$^2$) | | | |
|---|---|---|---|---|
| | 300 | 500 | 750 | 1000 |
| 1) | 10.7 | 13.0 | 14.9 | 16.9 |
| 2) | 10.7 | 12.3 | 13.8 | 15.5 |
| 3) | 7.7 | 12.6 | 16.5 | 19.4 |
| 4) | 7.3 | 7.9 | 7.8 | 8.7 |

It is seen that formulation 4) containing both the hindered amine stabilizers Tinuvin 770 and Chimassorb 944 as well as the nano-scaled filler Nanomer I. 42E exhibit synergistic stabilization as measured by low color formation.

Tinuvin® 770 is bis(2,2,6,6-tetramethylpiperidyl) sebacate. Chimassorb® 944 is the polycondensation product of 4,4'-hexamethylene-bis(amino-2,2,6,6-tetramethylpiperidine) and 2,4-dichloro-6-tert-octylamino-s-triazine. Irganox® 1098 is N,N'-hexane-1,6-diylbis(3-(3,5-di-tertbutyl-4-hydroxyphenylpropionamide)). Irgafos® 168 is tris(2,4-di-tert-butylphenyl) phosphite. Tinuvin®, Chimassorb®, Irganox® and Irgafos® are registered trademarks of Ciba Specialty Chemicals.

Nanomer® 1.42E is a surface modified montmorillonite mineral, available from Nanocor, Arlington Heights, Ill. It is characterized by a dry particle size of 16–22 microns, specific gravity 2.6, tan color, greater than 98% montmorillonite, average aspect ratio 300–500, thickness ca. 1 nm, 12% moisture.

EXAMPLE 2

Stabilized Polyamide

Example 1 is repeated with the additional use of the nano-scaled clay Cloisite 30B, available from Southern Clay.

Formulations 1)-4) are as in Example 1.

Formulation 5) contains 5% Cloisite 30B.

Formulation 6) contains 0.25% Tinuvin® 770, 0.25% Chimassorb® 944, 0.125% Irganox® 1098, 0.125% Irgafos® 168 and 5.0% Cloisite® 30B.

Delta E results for exterior xenon exposure (SAE J1960) are found in the table below:

| Formulation | Exposure (kJ/m$^2$) | | | |
|---|---|---|---|---|
| | 280 | 500 | 1000 | 1500 |
| 1) | 12.7 | 15.8 | 19.8 | 22.4 |
| 2) | 11.6 | 14.5 | 17.4 | 18.7 |
| 3) | 6.9 | 9.1 | 19.8 | 26.4 |
| 4) | 4.8 | 5.3 | 6.6 | 11.4 |
| 5) | 5.3 | 6.3 | 17.2 | 24.9 |
| 6) | 4.0 | 3.4 | 7.9 | 16.4 |

It is seen that formulations 4) and 6), containing both the hindered amine stabilizers Tinuvin 770 and Chimassorb 944 as well as a nano-scaled filler, exhibit synergistic stabilization as measured by low color formation.

Cloisite® 30B is a natural montmorillonite nano-scaled filler modified with a ternary ammonium salt. The ternary ammonium salt is $CH_3N^+(CH_2CH_2OH)TCl^-$, where T is hydrogenated tallow. Dry particle size are as follows: 10% less than 2 microns, 50% less than 6 microns, 90% less than 13 microns. Off white color. Loose bulk density 14.25 lbs/ft$^3$, packed bulk density 22.71 lbs/ft$^3$, specific gravity 1.98 g/cc. X-ray $d_{001}$=18.5 Angstroms.

Delta E results for interior xenon exposure (SAE J1885) are found in the table below:

| Formulation | Exposure (kJ/m$^2$) | | | |
|---|---|---|---|---|
| | 300 | 600 | 900 | 1200 |
| 1) | 9.2 | 11.0 | 12.3 | 13.0 |
| 2) | 11.4 | 13.3 | 14.5 | 15.4 |
| 3) | 9.9 | 10.3 | 11.1 | 11.3 |
| 4) | 8.2 | 8.6 | 8.6 | 8.4 |
| 5) | 6.2 | 6.4 | 6.9 | 7.1 |
| 6) | 4.9 | 4.3 | 4.4 | 4.4 |

It is seen that formulations 4) and 6), containing both the hindered amine stabilizers Tinuvin® 770 and Chimassorb® 944 as well as a nano-scaled filler, exhibit synergistic stabilization as measured by low color formation.

EXAMPLE 3

Stabilization of Thermoplastic Olefins

Molded test specimens are prepared by injection molding thermoplastic olefin (TPO) pellets containing pigments, a phosphite, a phenolic antioxidant or hydroxylamine, a metal stearate, ultraviolet light absorbers or a hindered amine stabilizer or a mixture of UV absorber and hindered amine stabilizer.

Pigmented TPO pellets are prepared from pure pigment or pigment concentrate, co-additives and commercially available TPO by mixing the components in a Superior/MPM 1" single screw extruder with a general all-purpose screw (24:1 L/D) at 200° C., cooled in a water bath and pelletized. The resulting pellets are molded into 60 mil, 2"×2" plaques at about 190° C. on a BOY 30M Injection Molding Machine.

Pigmented TPO formulation composed of polypropylene blended with a rubber modifier where the rubber modifier is an in-situ reacted copolymer or blended product containing copolymers of propylene and ethylene with or without a ternary component such as ethylidene norbornene are stabilized with a base stabilization system consisting of an N,N-dialkylhydroxylamine or a hindered phenolic antioxidant with or without an organophosphorus compound.

All additive and pigment concentrations in the final formulation are expressed as weight percent based on the resin.

Formulations contain thermoplastic olefin pellets and one or more of the following components: 0.0 to 2.0% pigment, 0.0 to 50.0% talc (traditional micro-scaled filler), 0.0 to 10% modified montmorillonite nano-scaled filler, 0.0 to 0.1% phosphite, 0.0 to 1.25% phenolic antioxidant, 0.0 to 0.1% hydroxylamine, 0.05 to 0.10 calcium stearate, 0.0 to 1.25% UV absorber, 0.0 to 1.25% hindered amine stabilizer (Tinuvin® 770 and Chimassorb® 944).

The components are dry-blended in a tumble dryer prior to extrusion and molding. Test plaques are mounted in metal frames and exposed in an Atlas Ci65 Xenon Arc Weather-Ometer at 70° C. black panel temperature, 0.55 W/m$^2$ at 340 nanometers and 50% relative humidity with intermittent light/dark cycles and water spray (Society of Automotive Engineers SAE J 1960 Test Procedure). Specimens are tested at approximately 625 kilojoule intervals by performing color measurements on an Applied Color Systems spectrophotometer by reflectance mode according to ASTM D 2244-79. Data collected include delta E, L*, a* and b* values. Gloss measurements are conducted on a BYK-Gardner Haze/Gloss Meter at 60° according to ASTM D 523.

It is found that TPO test plaques containing combinations of nano-scaled fillers and hindered amine light stabilizers are synergistically stabilized under the Weather-Ometer conditions.

EXAMPLE 4

Thermoplastics Stabilization

Examples 1–3 are repeated, replacing the hindered amine component with the following hindered amines:

the oligomeric compound which is the condensation product of 4,4'-hexamethylenebis(amino-(1-propyloxy-2,2,6,6-tetramethylpiperidine)) and 2,4-dichloro-6-[(1-propyloxy-2,2,6,6-tetramethylpiperidin-4-yl)butylamino]-s-triazine end-capped with 2-chloro-4,6-bis(dibutylamino)-s-triazine (the n-propoxy derivative of the corresponding N—H hindered amine below);

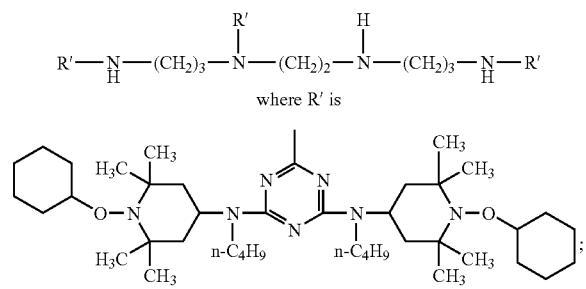

the oligomeric compound which is the condensation product of 4,4'-hexamethylenebis(amino-(2,2,6,6-tetramethylpiperidine)) and 2,4-dichloro-6-[(2, 2, 6, 6-tetramethylpiperidin-4-yl)butylamino]-s-triazine end-capped with 2-chloro-4,6-bis(dibutylamino)-s-triazine;
bis(2,2,6,6-tetramethylpiperidin-4-yl) sebacate;
polycondensation product of 2,4-dichloro-6-tert-octylamino-s-triazine and 4,4'-hexamethyllenebis(amino-2,2,6,6-tetramethylpiperidine);
polycondensation product of 1-(2-hydroxyethyl)-2,2,6,6-tetramethyl-4-hydroxypiperidine and succinic acid;
mixture of the polycondensation product of 1-(2-hydroxyethyl)-2,2,6,6-tetramethyl-4-hydroxypiperidine and succinic acid with the polycondensation product of 2,4-dichloro-6-tert-octylamino-s-triazine and 4,4'-hexamethylenebis(amino-2,2,6,6-tetramethylpiperidine);
bis(1,2,2,6,6-pentamethylpiperidin-4-yl) sebacate; di(1,2,2,6,6-pentamethylpiperidin-4-yl) (3,5-di-tert-butyl-4-hydroxybenzyl)butylmalonate;
polycondensation product of 2,4-dichloro-6-morpholino-s-triazine and 4,4'-hexamethylenebis(amino-2,2,6,6-tetramethylpiperidine);
polycondensation product of 2,4-dichloro-6-morpholino-s-triazine and 4,4'-hexamethylenebis(amino-(1-methyl-2,2,6,6-tetramethylpiperidine));
N,N',N'',N'''-tetrakis[(4,6-bis(butyl-1,2,2,6,6-pentamethylpiperidin-4-yl)-amino-s-triazin-2-yl]-1,10-diamino-4,7-diazadecane;

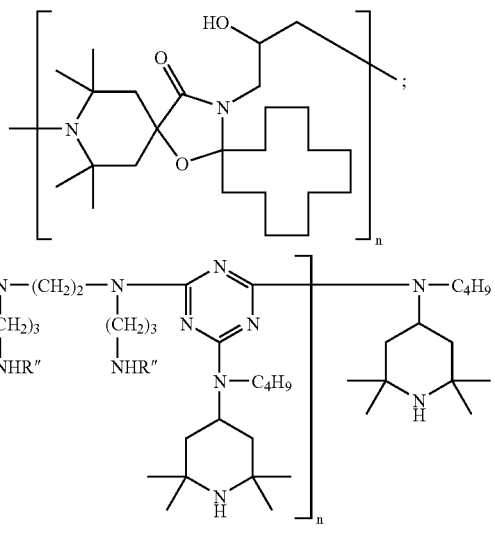

where R' = R'' or H and where R'' =

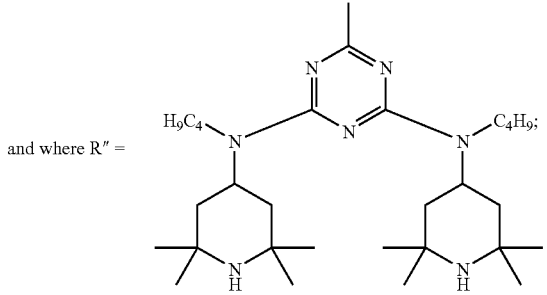

n is a number from the range from 2 to 200; and

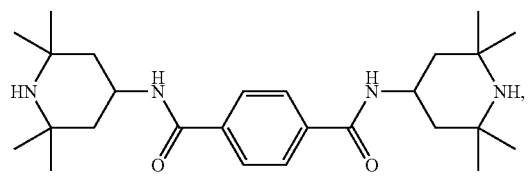

excellent stabilization results are achieved.

EXAMPLE 5

Thermoplastics Stabilization

Examples 1–4 are repeated, replacing polyamide and TPO with polypropylene and high density polyethylene. Excellent stabilization results are achieved.

EXAMPLE 6

Flame Retardancy of Polypropylene Fiber

Fiber grade polypropylene, is dry blended with the test additives and then melt compounded at 234° C. into pellets. All formulations additionally contain a melt processing stabilizer system. The pelletized fully formulated resin is then spun at 246° C. into fiber using a Hills laboratory model fiber extruder. The spun tow of 41 filaments is stretch at a ratio of 1:3.2 to give a final denier of 615/41.

The fibers are then knitted into socks and on a Lawson-Hemphill Analysis Knitter. Ten replicates of each sample are tested under NFPA701-1996 Vertical burn procedure. The time in seconds for the knitted sock to extinguish after the insult flame is removed is reported as "After Flame". Efficacy as a flame retardant is demonstrated when low After Flame times are observed relative to a blank sample containing no flame retardant. The burning time of the drips from the material and the weight loss are also recorded. The data demonstrates that the present compositions comprising both a nano-scaled filler and an N-alkoxy hindered amine stabilizer exhibit excellent flame retardant properties.

The N-alkoxy hindered amine

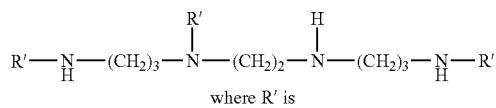

where R' is

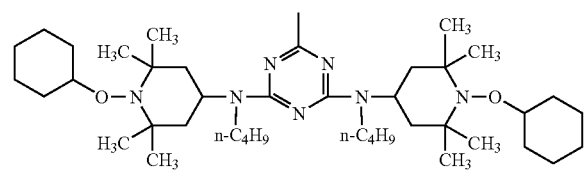

provides for exceptional flame retardant properties in the present compositions.

EXAMPLE 7

Flame Retardancy of Polypropylene Fiber

Example 6 is repeated with the further inclusion of additional traditional flame retardants. In addition to an N-alkoxy substituted hindered amine stabilizer, halogenated flame retardants are included in the formulation. Typical formulations contain an N-alkoxy hindered amine and a flame retardant such as: tris(3-bromo-2,2 bis(bromomethyl) propyl) phosphate (FMC PB370); bis(2,3-dibromopropyl ether) of bisphenol A (PE68); decabromodiphenyloxide (DBDPO); ethylene bis-tetrabromophthalimide (SATEX BT-93); or ethylene bis-dibromonor-bornanedi-carboximide (SATEX BN-51). Other formulations may contain phosphorous based flame retardants such as ethylene diamine diphosphate (EDAP). The data demonstrates that the present compositions comprising a nano-scaled filler, an N-alkoxy hindered amine stabilizer and a traditional flame retardant exhibit excellent flame retardant properties.

EXAMPLE 8

Flame Retardancy of Polypropylene Thick Sections

Molding grade polypropylene is dry blended with test additives and then melt compounded into pellets. In addition to the N-alkoxy hindered amine, halogenated flame retardants may also be included in the formulation. Typical formulations may also contain the instant compound and a flame retardants such as: tris(3-bromo-2,2 bis(bromomethyl) propyl) phosphate (FMC PB370); bis(2,3-dibromopropyl ether) of bisphenol A (PE68); decabromodiphenyloxide (DBDPO); ethylene bis-tetrabromophthalimide (SATEX BT-93); ethylene bis-dibromonorbornanedi-carboximide (SATEX BN-451). Other formulations may contain $Sb_2O_3$ in addition to the brominated flame retardants. Other formulations may contain phosphorous based flame retardants such as ethylene diamine diphosphate (EDAP). The pelletized fully formulated resin is then compression molded into test specimens using a Wabash Compression Molder.

Test plaques are tested under UL-94 Vertical burn conditions. A minimum of three replicates are tested. The average time in seconds for the test sample to extinguish after a first and second insult flame is removed is reported. Efficacy as a flame retardant is demonstrated when low Flame times are observed. The data demonstrates that the present compositions comprising a nano-scaled filler and an N-alkoxy hindered amine stabilizer exhibit excellent flame retardant properties. Further, the present compositions comprising a nano-scaled filler, an N-alkoxy hindered amine stabilizer and a traditional flame retardant also exhibit excellent flame retardant properties. Excellent light stability properties are also observed for the present flame retardant compositions.

EXAMPLE 9

Flame Retardancy

Example 8 is repeated, replacing the PP substrate with substrates selected from TPO thich sections, ABS molding applications and HIPS (high impact polystyrene) molding applications. Excellent flame retardandcy and light stability are observed.

What is claimed is:

1. A polyamide composition, stabilized against the deleterious effects of oxidative, thermal or light-induced degradation, which composition comprises
   (a) a polyamide substrate,
   (b) at least one nano-scaled filler with a platelet structure where the platelets have a thickness below 2 nm, and
   (c) a 1:1 mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine).

2. A composition according to claim 1, wherein the filler is an organophilic phyllosilicate, a naturally occuring phyllosilicate, a synthetic phyllosilicate or a mixture of such phyllosilicates.

3. A composition according to claim 1, in which component (b) is present in an amount of 0.5 to 10% by weight, based on the weight of component (a).

4. A composition according to claim 1, in which component (c) is present in an amount of 0.01 to 10% by weight, based on the weight of component (a).

5. A composition according to claim 1, further comprising
   (d) at least one additive selected from the group consisting of additional hindered amine light stabilizers, ultraviolet light absorbers, phenolic antioxidants, organic phosphorus stabilizers, aminic antioxidants, hydroxylamine stabilizers, nitrone stabilizers, benzofuranone stabilizers and amine oxide stabilizers.

6. A process for effectively stabilizing a polyamide substrate subject to the deleterious effects of oxidative, thermal or light-induced degradation, which process comprises incorporating into a polyamide substrate an effective stabilizing amount of
   (b) at least one nano-scaled filler with a platelet structure where the platelets have a thickness below 2 nm and (c) a 1:1 mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine).

7. A flame retardant polyamide composition which comprises
(a) a polyamide substrate,
(b) at least one nano-scaled filler with a platelet structure where the platelets have a thickness below 2 nm,
(c) a 1:1 mixture of bis(2,2,6,6-tetramethylpiperidin-4-yl) sebacate and the polycondensation product of 2,4-dichloro-6-tert-octylamino-s-triazine and 4,4'-hexamethylenebis(amino-2,2,6,6-tetramethylpiperidine) and
(d) at least one compound selected from the group consisting of brominated flame retardants, phosphorus containing flame retardants and inorganic flame retardants.

8. A polyamide composition according to claim 1 in which the polyamide is polyamide 6,6.

* * * * *